US007399102B2

(12) United States Patent
Sullivan

(10) Patent No.: US 7,399,102 B2
(45) Date of Patent: Jul. 15, 2008

(54) PORTABLE SELF CONTAINED LIGHT GENERATING DEVICE POWERED BY A FLOW OF FALLING GRANULAR MATERIAL

(76) Inventor: James E. Sullivan, Rd 1 Box 36C, Colliers, WV (US) 26035

(*) Notice: Subject to any disclaimer, the term of this patent is extended or adjusted under 35 U.S.C. 154(b) by 122 days.

(21) Appl. No.: 11/604,382

(22) Filed: Nov. 27, 2006

(65) Prior Publication Data

US 2008/0123330 A1 May 29, 2008

(51) Int. Cl.
*B60Q 1/00* (2006.01)

(52) U.S. Cl. ....................... 362/193; 362/192; 968/805; 368/93; 368/95

(58) Field of Classification Search ....................... None
See application file for complete search history.

(56) References Cited

U.S. PATENT DOCUMENTS 1,694,059 A * 12/1928 Denny ......................... 368/93
3,125,849 A * 3/1964 Wachtel ....................... 368/93
3,935,702 A 2/1976 Tamada
3,974,638 A * 8/1976 Haber ....................... 368/227
4,267,588 A * 5/1981 Daniels ....................... 368/93
4,474,481 A 10/1984 Croyle
6,579,003 B2 6/2003 Glick et al.
6,924,598 B2 * 8/2005 Strattman .................. 313/609
D510,284 S 10/2005 Hsu

* cited by examiner

*Primary Examiner*—Sandra O'Shea
*Assistant Examiner*—Danielle Dunn

(57) ABSTRACT

A portable self contained light generating device which is powered by a flow of granular material falling under the influence of gravity to impinge upon and cause a paddle wheel to rotate thereby turning a small generator producing electricity to power one or more light emitting diodes for illumination. The device equipped with a multi-position power/illumination control switch and in some embodiments also provided with a battery providing supplemental power.

13 Claims, 2 Drawing Sheets

PORTABLE SELF CONTAINED LIGHT GENERATING DEVICE POWERED BY A FLOW OF FALLING GRANULAR MATERIAL

FIELD OF THE DISCLOSURE

The disclosures made herein relate generally to portable electric lighting devices and, more particularly, to portable lighting devices which operate without the need for batteries or an external electrical supply by converting potential energy of a flowing granular mass into kinetic energy to operate a generator.

BACKGROUND

The use of portable lighting devices is well known in the prior art. Many examples are known which use one or more batteries to power a variety of light producing devices including incandescent bulbs and fluorescent lamps. Certain varieties of such known portable lighting devices are equipped with rechargeable batteries eliminating the need to purchase replacement batteries after one discharge.

A limitation of battery operated portable lighting devices is that the batteries provide a limited supply of stored energy and therefore operate a light for a limited amount of time before draining beyond use. In such cases new batteries must be available to return the portable lighting device to service.

A limitation of battery operated portable lighting devices utilizing rechargeable batteries and lacking an internal power source is that the rechargeable batteries store a limited amount of electrical energy providing illumination for a limited amount of time before requiring recharge. While the rechargeable batteries may be recharged multiple times, an external power source must be available to supply power to restore the charge.

Additionally, it is known to have portable electric lighting devices operated without batteries or an external electric power supply by the use of a hand crank, squeeze trigger or similar means operating a small electric generator to produce enough current to operate the lamp of the device.

A limitation of such self powered electric lighting devices is that the hand crank or similar means must be continually operated in order to keep the portable lighting device illuminated. This procedure is inconvenient for many tasks where both hands must be free and available to work.

Therefore, a portable self contained light generating device which eliminates the need for batteries as well as external power to operate the light, a self contained light generating device which utilizes high efficiency solid state light emitting diodes, a self contained light generating device which is configured to produce electricity to operate the light emitting diodes by converting a portion of the kinetic energy granular material flowing under the influence of gravity, such a portable self contained light generating device would be useful and novel.

SUMMARY OF THE DISCLOSURE

Accordingly, embodiments of the inventive disclosures made herein comprise various embodiments of a portable self contained light generating device powered by a flow of a falling granular material which impinges upon and thereby causes a paddle wheel to rotate, turning a small generator producing electricity to power one or more light emitting diodes.

Embodiments of the device include upper and lower chambers connected by a neck, the chambers and neck in at least some embodiments having the appearance of an hour glass. Embodiments of the device include a support means having two opposing substantially flat base members which are held in a spaced parallel relationship by one or more support rods which span between the bases and are secured to the bases near the base edges. The device includes first and second chambers which alternately dispense then later receive granular material after the device is turned by 180 degrees. The first and second chambers are connected by a neck having a passage through which a small flow of granular material may fall under the influence of gravity from one chamber to the other. The first and second chambers are contained between the bases of the support means. A paddle wheel is rotatably mounted in the neck to intercept granular material flowing through the neck between the first and second chambers. A generator is connected to the shaft of the paddle wheel such that rotation of the paddle wheel causes the shaft of the generator to rotate thereby causing the generator to produce an electric potential. The device has one or more light emitting diodes secured to the support means. The light emitting diodes are provided on one or more sides of the support means. A multi-position power switch for controlling the operation of the LEDs for controlling the amount of illumination is secured to the support means. The power switch is interposed in the electrical circuits between the generator and the light emitting diodes.

In at least one embodiment the self contained light generating device powered by a flow of falling granular material further includes a battery secured within the base of the support means of the device. The rechargeable battery is electrically connected to the generator such that the generator, when operating, charges the battery. The rechargeable battery is available to provide electrical energy to operate the light emitting diodes on the device after the granular material has transitioned from the top chamber to the bottom and is no longer available to operate the paddle wheel, or when additional electrical energy is required to supplement the energy supplied by the generator. In some of these embodiments, the battery is a rechargeable battery.

In at least one embodiment of the self contained light generating device powered by a flow of falling granular material the multi-position switch has four positions, specifically an 'off' position as well as 'low', 'medium' and 'high' illumination settings. The lower settings consuming less power and providing for longer operating times, specifically when operating from the battery. In various embodiments, LEDs may be dimmed using one of two methods. The first method involves a reduction of the current flow through the LED. Many common LEDs are rated for a maximum current of 20 mA, but may be provided with less current (say through the use of a larger current limiting resistor in series with the LED or LEDs) where reducing the current effects a proportional reduction in illumination. Illumination may also be reduced by turning off a number of the LEDs, in this way reducing illumination and power consumption. Either method is suitable for use on embodiments provided in this disclosure. In certain embodiments, a portion of the LEDs may also comprise high flux LEDs having a higher light output. Such LEDs also draw a higher current and require more power than standard LEDs. In these embodiments the high flux LEDs may be deactivated by the multi-position switch when the switch is moved from the high to the medium or low illumination setting.

In some embodiments the self contained light generating device powered by a flow of falling granular material is provided with LEDs on the vertical support rods alone. In other embodiments the self contained light generating device powered by a flow of falling granular material is provided with LEDs on the support rods as well as on the bases of the support means. In certain embodiments LEDs are provided on one side of the support means, while in other embodiments LEDs are provided on two sides or in other embodiments on all four sides of the support means.

In some embodiments of the self contained light generating device powered by a flow of falling granular material, the granular material is a variety of common dry sand such as used in conventional hour glass timers. In other embodiments the granular material is a dense metallic granular material such as lead, steel, brass, or iron. The granules may be in various granular shapes such as round pellets or square pellet shapes, and in a variety of granule or pellet sizes where the granule or pellet size and material density is chosen to have sufficient mass so that when falling as a stream or flow the granules or pellets provide sufficient impact force on the paddle wheel to result in sufficient torque to cause the paddle wheel to rotate and operate the small generator under its working load, where the working load consists of the activated LEDs and possibly the rechargeable battery. In certain embodiments the multi-position switch restricts the rechargeable battery to recharge from the generator when the LEDs are turned off so as to maximize the amount of electrical power available to operate the LEDs.

In some embodiments of the self contained light generating device powered by a flow of falling granular material, the chambers are transparent such that the level of the granular material in the chambers is easily observed, such as a clear plastic or glass. In other embodiments the chambers are made of an opaque material such as a variety of plastic or metals.

It is an objective of the inventive disclosure made herein to provide a self contained light generating device that eliminates the need for batteries as well as external power to operate the light.

It is another objective of the inventive disclosure made herein to provide a self contained light generating device that utilizes high efficiency solid state light emitting diodes to produce the high amount of illumination from a limited electrical supply.

It is another objective of the inventive disclosure made herein to provide a self contained light generating device that is configured to produce electricity to operate the light emitting diodes by converting a portion of the kinetic energy of a flow of granular material streaming between the upper to lower chambers under the influence of gravity.

It is another objective of the inventive disclosure made herein to provide a self contained light generating device that further includes a battery to supplement the electrical power supplied by the generator or to provide power to operate the LED lights when the generator is not operating.

These and other objects of the invention made herein will become readily apparent upon further review of the following specification and associated drawings.

BRIEF DESCRIPTION OF THE DRAWINGS

The drawings show a form of the invention that is presently preferred, however, the invention is not limited to the precise arrangement shown in the drawings.

DETAILED DESCRIPTION OF THE DRAWINGS

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein.

Figure 1:
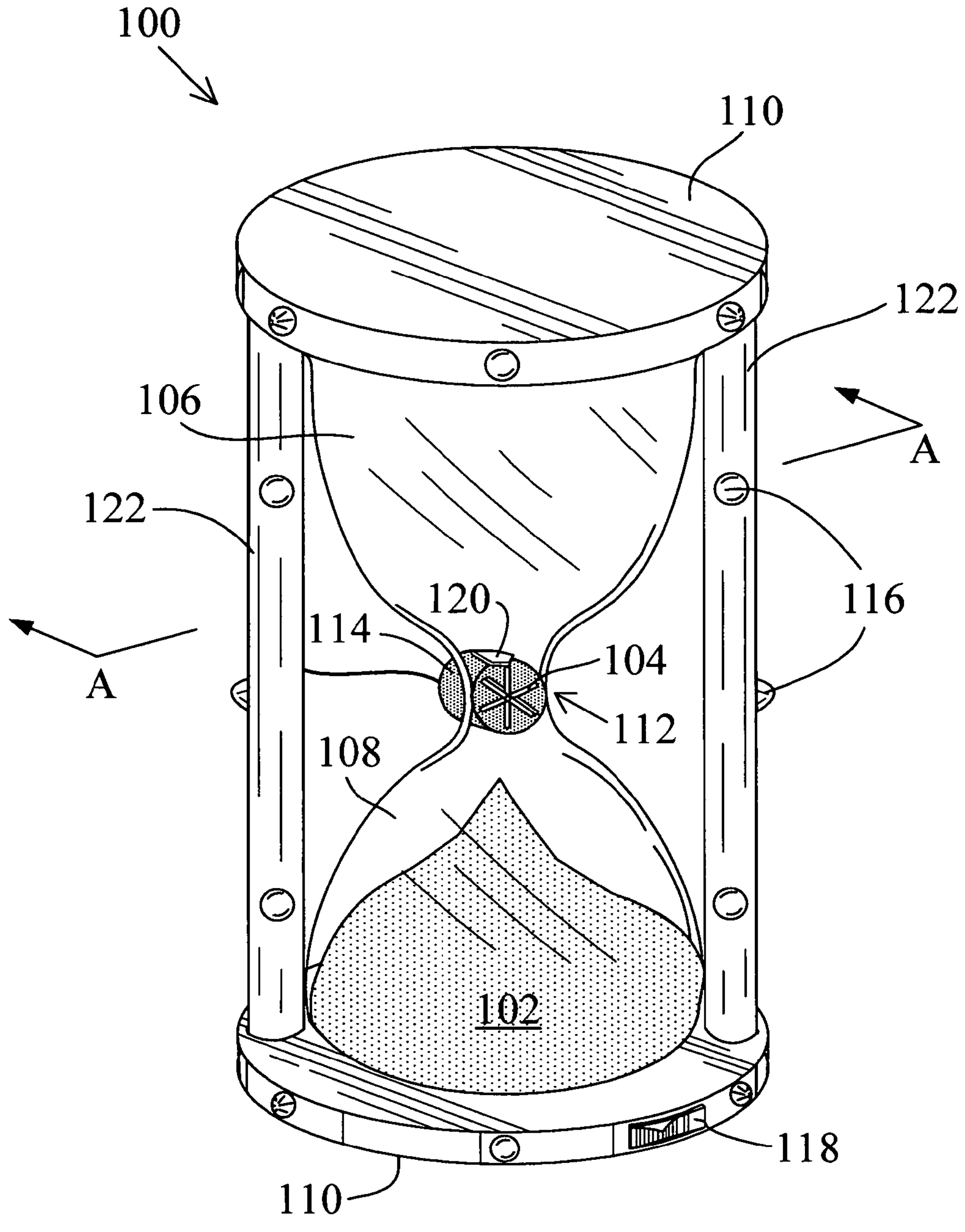
FIG. 1 depicts a perspective view of one embodiment of the self contained light generating device in accordance with the inventive disclosures herein.
Figure 2:
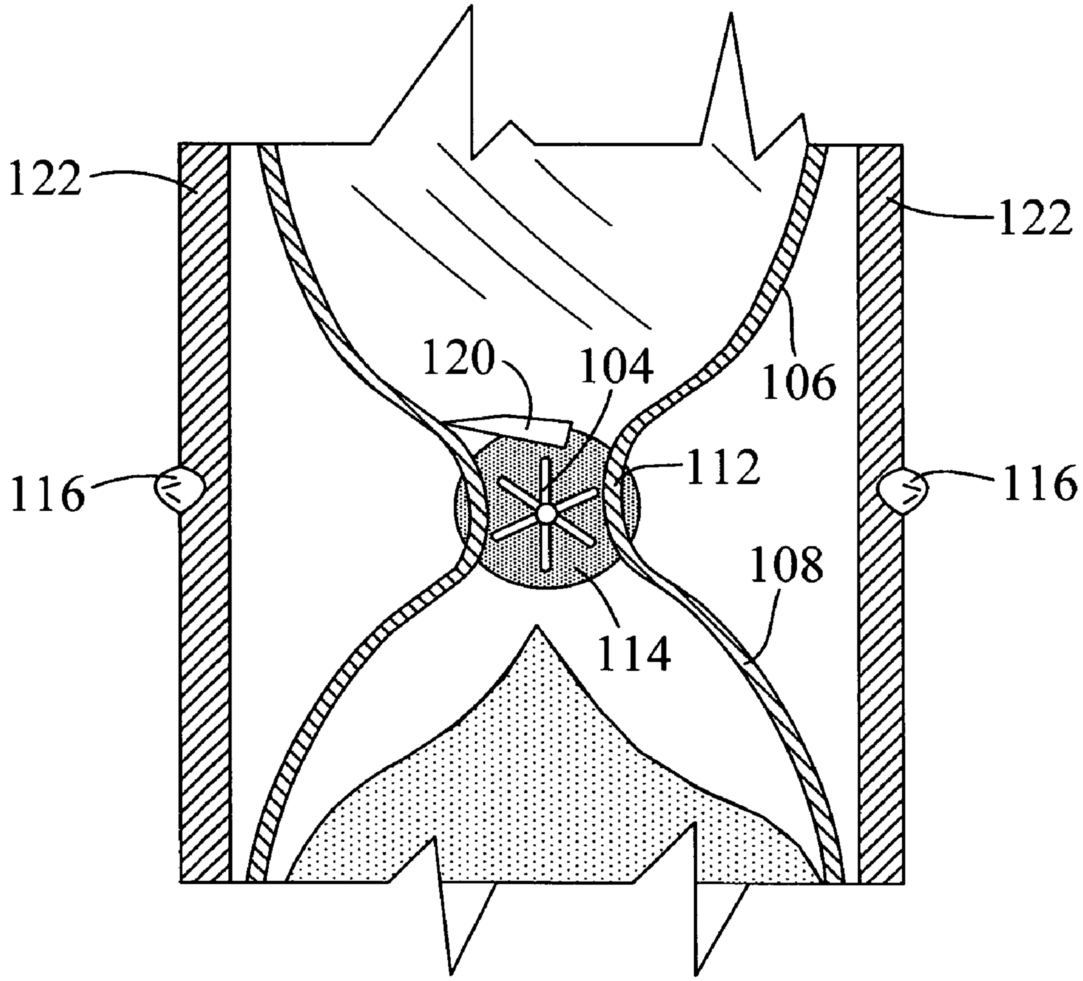
FIG. 2 depicts a section view along A-A of FIG. 1 of one embodiment of the self contained light generating device in accordance with the inventive disclosures herein.

Turning now to FIG. 1 and FIG. 2:

FIG. 1 depicts a perspective view of one embodiment of the self contained light generating device in accordance with the inventive disclosures herein. FIG. 2 depicts a section view along A-A of FIG. 1 of one embodiment of the self contained light generating device in accordance with the inventive disclosures herein. The portable self contained light generating device 100 has two bases 110, each base substantially flat and configured to support the light generating device in an upright position on either base. One or more of support rods 122 span between the bases and are secured to the bases, holding the bases in a fixed, spaced parallel arrangement. Upper chamber 106 and lower chamber 108 are connected by a neck 112 in a conventional hour glass shape. A baffle 120 restricts to opening in the neck between the upper and lower chambers to guide the granular material 102 to one side of the paddle wheel. Granular material 102 such as sand or denser metallic granules/pellets flow under the force of gravity from the upper chamber 106 to the lower chamber 108. After all the granular material has moved from the upper chamber to the lower chamber, the device may be flipped by 180 degrees to rest upon the other base so that the granular material is free to flow through the neck 112 from one chamber to the other. As the granular material flows through the neck, the flowing material impinges upon and provides a rotational torque to the paddle wheel 104, which as it rotates operates the small electric generator 114. Power generated by the generator is available to illuminate one or more light emitting diode (LED) lights 116. The illumination level of the LEDs is controlled by the multi-position switch 118 as discussed earlier in the summary of the invention.

The discussed construction, illustrations and sequence of operation is for one embodiment of the invention, but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, and mechanical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A portable self contained light generating device powered by a flow of falling granular material turning a paddle wheel, the light device comprising:

a support means having two opposing substantially flat base members held in a distally spaced relationship by a plurality of support rods which span between the bases and are secured to the bases, the bases and support rods defining an interior region, the bases configured to support the light generating device in an upright position on the base when the base is resting on a substantially horizontal surface;

first and second chambers for holding granular material, the chambers contained within the interior region of the support means;

granular material received into and filling a portion of at least one chamber;

a neck having a passage therethrough providing communication between the first and second chambers through which the granular material can flow;

a paddle wheel rotatably mounted in the passage of the neck to intercept granular material flowing through the neck between the first and second chambers;

a baffle secured to the interior of the neck, restricting the flow of granular material to one half of the paddle wheel;

a generator connected to a shaft of the paddle wheel, wherein granular material flowing through the neck between the chambers urges that paddle wheel to rotate thereby operating the generator to produce an electric potential;

one or more light emitting diodes (LEDs) secured to the support means, the light emitting diodes provided on at least one side of the support means;

a multi-position power switch secured to the support means, the power switch interposed in at least one electrical circuit between the generator and the light emitting diodes, wherein the granular material flows from one chamber to the other chamber under the influence of gravity, the flowing granular material causing the paddle wheel to rotate operating the generator, the generator providing electric power to operate at least some of the light emitting diodes.

2. The portable self contained light generating device of claim 1 further comprising:

a battery secured within the base of the support means, the battery electrically connected to the generator such that the generator charges the battery, the rechargeable battery providing electrical energy to operate the light emitting diodes.

3. The portable self contained light generating device of claim 2, wherein:

the multi-position switch has illumination settings comprising low, medium, high and off.

4. The portable self contained light generating device of claim 1, wherein the light emitting diodes are provided on one side of the support means.

5. The portable self contained light generating device of claim 1, wherein the light emitting diodes are provided on two sides of the support means.

6. The portable self contained light generating device of claim 1, wherein the light emitting diodes are provided on four sides of the support means.

7. The portable self contained light generating device of claim 3 wherein the granular material comprises sand.

8. The portable self contained light generating device of claim 3, wherein the granular material is high density metallic granular material selected from the set consisting of: lead, steel, iron, brass.

9. The portable self contained light generating device of claim 1 wherein walls of the chambers are substantially transparent.

10. The portable self contained light generating device of claim 2, wherein the battery is a rechargeable battery.

11. The portable self contained light generating device of claim 3, wherein the multi-position switch removes electrical power from a defined portion of the LEDs when illumination is reduced from high to medium, and similarly again from medium to low.

12. The portable self contained light generating device of claim 3, wherein the multi-position switch reduces the current flow to the LEDs when illumination is reduced from high to medium, and similarly again from medium to low.

13. The portable self contained light generating device of claim 3, wherein a portion of the LEDs are high flux LEDs offering higher light output, and wherein the high flux LEDs are deactivated by the multi-position switch when the switch is moved from the high to the medium or low settings.

* * * * *